United States Patent
Wu

(10) Patent No.: US 9,482,250 B2
(45) Date of Patent: Nov. 1, 2016

(54) PACKING SET

(71) Applicant: Tung-Lin Wu, Chiayi (TW)

(72) Inventor: Tung-Lin Wu, Chiayi (TW)

(\*) Notice: Subject to any disclaimer, the term of this patent is extended or adjusted under 35 U.S.C. 154(b) by 0 days.

(21) Appl. No.: 14/748,436

(22) Filed: Jun. 24, 2015

(65) Prior Publication Data

US 2015/0292534 A1 Oct. 15, 2015

(51) Int. Cl.
*B23P 19/04* (2006.01)
*F16B 2/06* (2006.01)
*E02B 7/22* (2006.01)
*E02B 7/54* (2006.01)

(52) U.S. Cl.
CPC ............... *F16B 2/065* (2013.01); *E02B 7/22* (2013.01); *E02B 7/54* (2013.01)

(58) Field of Classification Search
CPC .............. B25B 27/00; B25B 27/0028; B25B 27/0035; B25B 27/0042; B25B 27/0064
See application file for complete search history.

(56) References Cited

U.S. PATENT DOCUMENTS

| | | | | |
|---|---|---|---|---|
| 7,047,610 | B2* | 5/2006 | Dawson | F16H 7/24 269/249 |
| 7,789,379 | B2* | 9/2010 | Livingston, Jr. | B25B 1/2405 269/249 |
| 2005/0133979 | A1* | 6/2005 | Livingston, Jr. | B25B 5/163 269/249 |
| 2015/0292534 | A1* | 10/2015 | Wu | E02B 7/22 24/569 |

\* cited by examiner

*Primary Examiner* — Lee D Wilson

(57) ABSTRACT

A packing set includes a stop block and a packing. The stop block is penetrated by and installed with an abutment device and the packing includes a main body and a packing kit. Both ends of the main body extend downward with a protruding part. Each protruding part has a transverse rib stretching outward from the side thereof and the other end of the transverse rib has a vertical rib extending perpendicularly. The main body has a screw for placing the packing kit. The packing kit includes a stud that penetrates the screw. The stud has an operating rod installed in one end and an abutment board installed in the other end. The stop block can be installed in both sides of any water retaining column and is used as a clamp incorporated with the packing for performing the packing action on the gate boards.

1 Claim, 6 Drawing Sheets

PACKING SET

BACKGROUND OF THE INVENTION

1. Field of the Invention

The invention relates to a water retaining gate board and more particularly to a packing set that can significantly reduce the gaps existing between the water retaining gate boards.

2. Description of Related Art

Whenever the weather, such as a typhoon, hurricane, and storm, brings vast amount of rain, residences may be flooded and suffer losses financially or damages of belongings and household items, as a result of construction excavation, a low-lying area, poor drainage, an area below sea level. Or, the residents have to relocate and move their belongings to a higher ground in order to prevent items from soaking in the rain, flood or sea water.

There is a conventional tightening device of grids of water-retaining wall which indicates that a plurality of insertion slots are set up on both sides of the water retaining columns in multiple preset heights and in pair. A packing unit can be freely installed onto or removed from the insertion slots wherein each packing unit has two legs of a U-shaped frame that can perfectly insert into the insertion slots on both sides of the water-retaining column, In addition, a pressure-retaining element is installed on the U-shaped frame and has a retractable pressure-retaining arm. Inserting the legs of the packing unit into the insertion slots of the water retaining columns at a proper height, and adjusting the length of the retractable pressure-retaining arm of the pressure-retaining element in order to generate packing pressure against the water retaining gate boards, the sealability of the gaps between the water retaining gate boards can be improved.

However, although the aforementioned disclosure packs the water retaining gate boards from the top, the water indeed flows in a horizontal direction into the residential houses. When the rain lasts too long or a vast volume of rain downpours within a short period of time, it may easily result in permeation of rain through the gaps between the gate boards and the columns.

Thus, the need for improvement still exists.

SUMMARY OF THE INVENTION

The invention is to provide a structure that solves the aforementioned problem by reducing the gaps between the water retaining gate boards and increasing the sealability of the water retaining gate boards.

In order to solve the aforementioned problem, the invention reveals a packing set comprising a stop block and a packing, wherein the stop block is penetrated by and installed with an abutment device, and the packing comprises a main body and a packing kit wherein both ends of the main body extend downward with a protruding part individually; each protruding part has a transverse rib stretching outward from the side thereof; the other end of the transverse rib has a vertical rib extending therefrom perpendicularly; the main body has a screw for placing the packing kit; the packing kit comprises a stud that penetrates the screw; the stud has an operating rod installed in one end and an abutment board installed in the other end whereas the operating rod penetrates the stud and is in a perpendicular setting therewith, wherein the vertical ribs can be located on both sides of the transverse rib to form a T-shaped setting; wherein the abutment device is a bolt and the end of the bold has a holding item.

The main features of the invention are that the stop block of the invention can be installed on the water retaining gate boards (including the water retaining columns and the water retaining boards) of any specifications available in the market. Besides, there is no limit as of the height and quantity for installation. Through the use of stop blocks installed on the water retaining gate boards, the stop blocks and the packing can engage with each other tightly. Next, the packing packs the water retaining gate boards from the top down to reduce the gaps between the water retaining gate boards and thus to decrease the possibility of permeation of water.

The secondary feature of the invention is that the stop block is penetrated by and installed with an abutment device and can further pack the water retaining gate boards horizontally from either side of the water retaining columns. In addition, the water retaining columns available in the market nowadays all come with waterproof rubber strips. Through the packed water retaining gate boards and the use of waterproof rubber strips, the gaps can be further reduced thus to further enhance the water-resistant effect.

The above and other objects, features and advantages of the invention will become apparent from the following detailed description taken with the accompanying drawings.

DETAILED DESCRIPTION OF THE INVENTION

Figure 1:
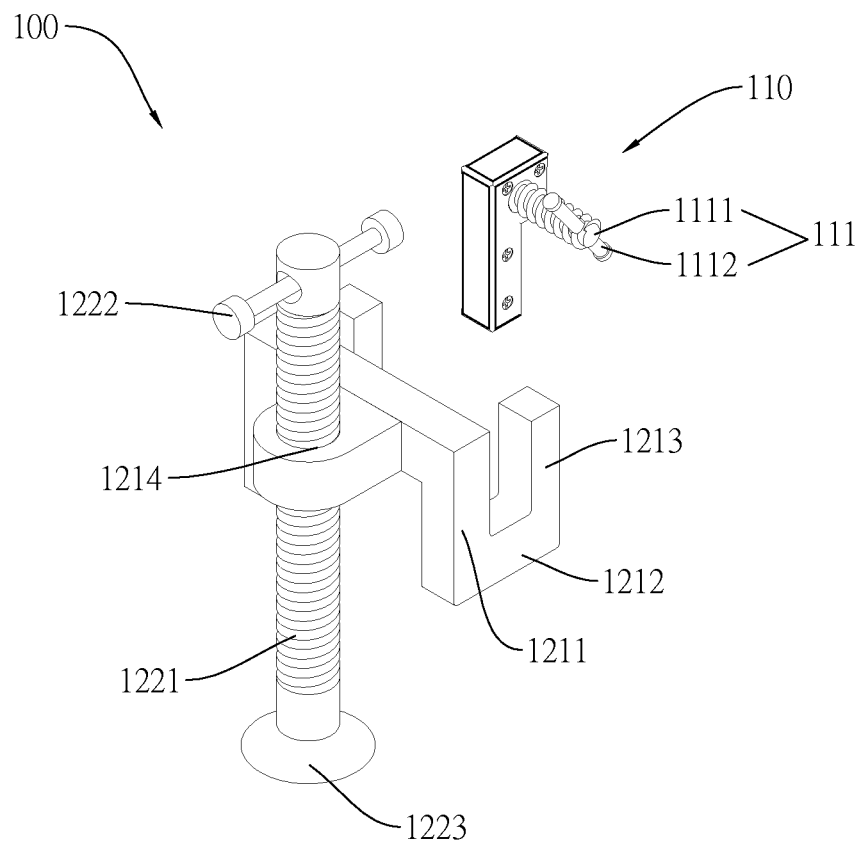
FIG. 1 is a perspective view of the invention.
Figure 2:
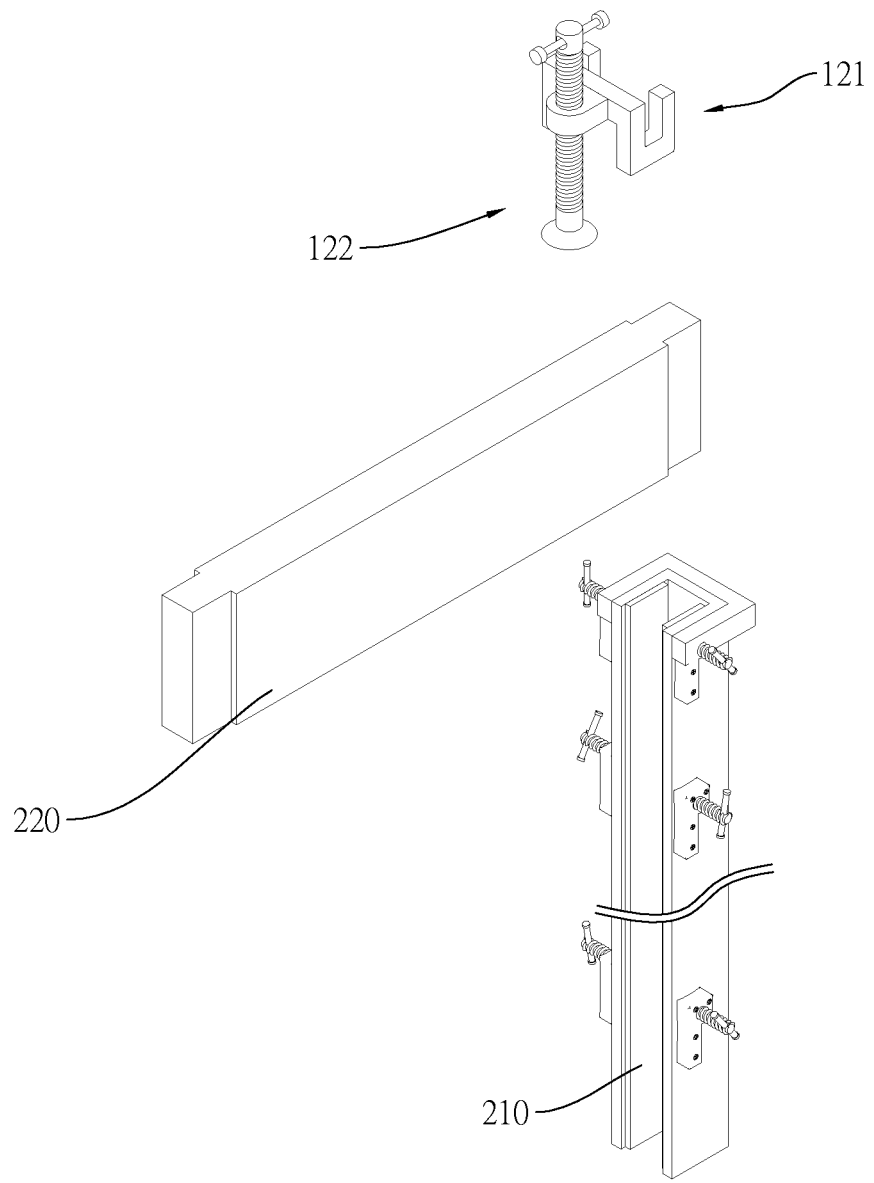
FIG. 2 is a schematic diagram for installation of the invention.
Figure 3:
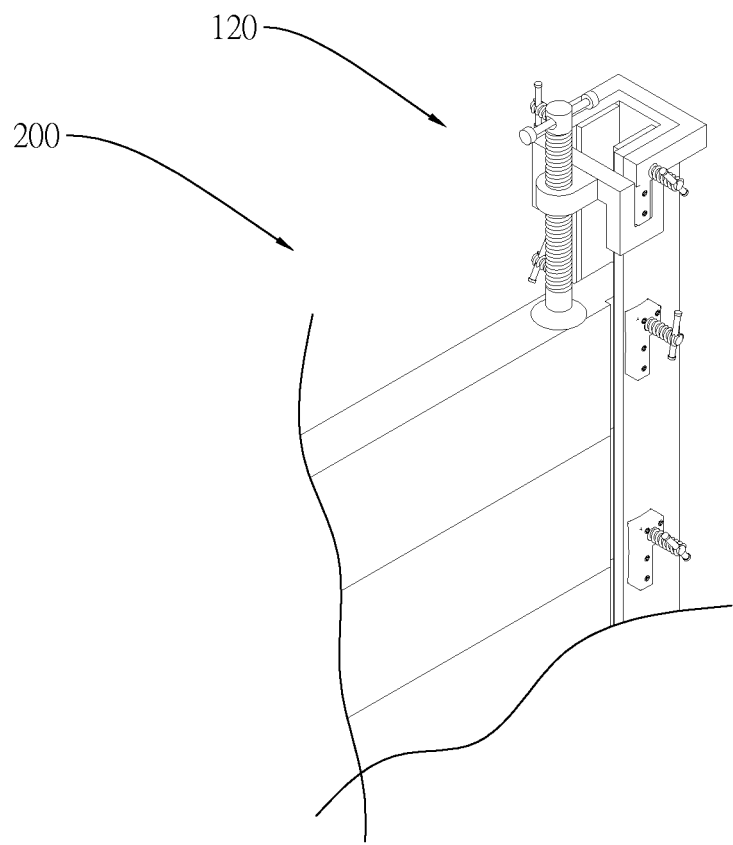
FIG. 3 is another schematic diagram for installation of the invention.

Referring to FIGS. 1 to 3, a packing set 100 in accordance with a first preferred embodiment of the invention comprises a stop block 110 and a packing 120, wherein the stop block 110 is penetrated by and installed with an abutment device 111, and the packing 120 comprises a main body 121 and a packing kit 122 wherein both ends of the main body 121 extend downward with a protruding part 1211 individually; each protruding part 1211 has a transverse rib 1212 stretching outward from the side thereof; the other end of the transverse rib 1212 has a vertical rib 1213 extending therefrom perpendicularly; the main body 121 has a screw 1214 for placing the packing kit 122; the packing kit 122 comprises a stud 1221 that penetrates the screw 1214; the stud 1221 has an operating rod 1222 installed in one end and an abutment board 1223 installed in the other end whereas the operating rod 1222 penetrates the stud 1221 and is in a perpendicular setting therewith; with the operating rod 1222 connecting to the stud 1221 by means of penetration, the operating rod can be moved around horizontally for adjustment by users during operation.

Furthermore, the abutment device 111 is a bolt 1111 and the end of the bolt 1111 has a holding item 1112.

The invention can be installed on the water retaining gate boards 200 (including the water retaining columns 210 and the water retaining boards 220) commonly used and sold in the market. The invention mainly is to reduce the small gaps more or less exist in the water retaining gate boards 200 during operation; prevent water from permeation through the gaps; thus further enhance the water-resistant effect of the water retaining gate boards 200 during flooding.

Figure 4:
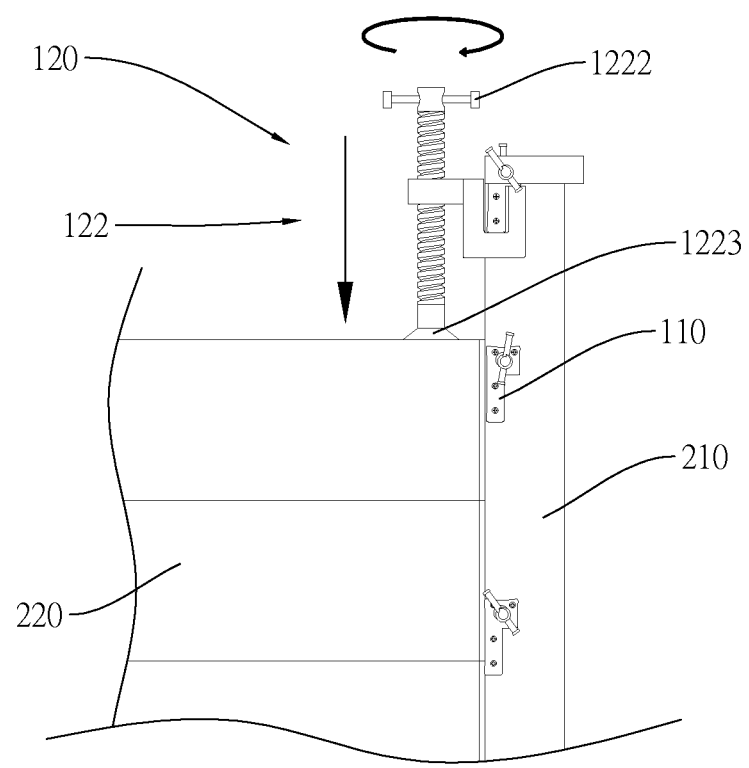
FIG. 4 is a schematic diagram of the embodiment of the invention.
Figure 5:
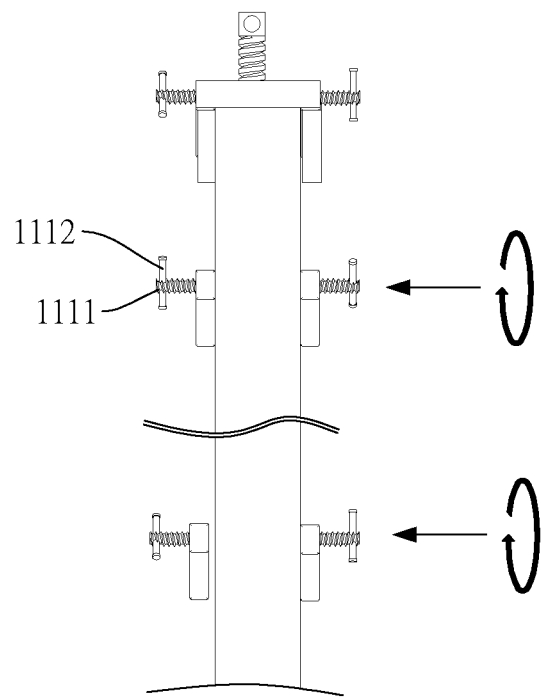
FIG. 5 is another schematic diagram of the embodiment of the invention.

Referring to FIGS. 4 and 5, the invention first installs the stop blocks 110 on both sides of the water retaining column 210 (the quantity and height can be adjusted depending on the conditions). The packing 120 and the stop block 110 are engaged with each other perfectly so that the packing 120, once connected, will not become loose due to slight impact. After the aforementioned steps are completed, apply the packing kit 122 to pack the water retaining boards 220 from top down in order to tighten the connection further between all water retaining boards 220. In addition, to avoid the stress being over concentrated during packing, the other end opposite to the operating rod 1222 is installed with an abutment board 1223 wherein the abutment board 1223 can disperse the concentrated stress to protect the top area of the water retaining board 220 where the force is applied.

Next, once the aforementioned steps have been completed, use the abutment device 111 installed on the stop block 110 to further pack the water retaining boards 220 along the horizontal direction to reduce the gaps between the water retaining boards 220 and the water retaining columns 210. In addition, the water retaining columns 210 sold in the market nowadays all come with waterproof rubber strips. Through the use of flexible waterproof rubber strips, the gaps between the water retaining columns 210 and the water retaining boards 220, which have been packed already, can be further reduced wherein the holding item 1112 that penetrates the bolt 1111 can be adjusted to left or right by users for the convenience of operation.

Figure 6:
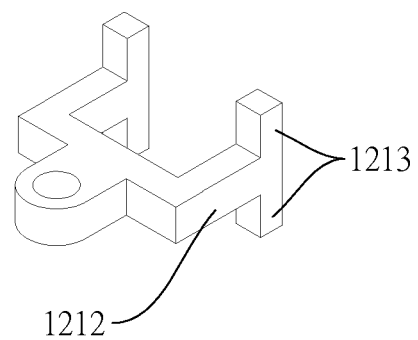
FIG. 6 is a schematic diagram of another type of main body of the invention.

Referring to FIG. 6, a second preferred embodiment of the invention is shown. The main body has a transverse rib 1212 installed wherein both ends of the transverse rib 1212 are installed with vertical ribs 1213 that are perpendicular to the transverse rib 1212 to form a T-shaped setting.

While the invention has been described in terms of preferred embodiments, those skilled in the art will recognize that the invention can be practiced with modifications within the spirit and scope of the appended claims.

What is claimed is:

1. A packing set, comprising:
   a stop block; and
   a packing;
   wherein the stop block is penetrated by and provided with a bolt;
   wherein the packing includes a main body and a packing kit;
   wherein each of two downward extending ends of the main body is provided with a protruding part;
   wherein each protruding part includes a transverse rib extending horizontally from a side thereof, and a vertical rib extending from an end of the transverse rib, the vertical rib being perpendicular to the transverse rib;
   wherein the main body includes a screw for placing the packing kit;
   wherein the packing kit includes a stud penetrating the screw;
   wherein the stud includes an operating rod disposed at a first end and an abutment board disposed at a second end;
   wherein an end of the bolt is provided with a holding item;
   wherein the operating rod penetrates the stud; and
   wherein the operating rod is perpendicular to the stud.

* * * * *